United States Patent [19]

Glaudel et al.

[11] Patent Number: 5,895,863

[45] Date of Patent: Apr. 20, 1999

[54] SMART FLOWMETER PRE-AMPLIFIER

[75] Inventors: Stephen P. Glaudel, Lansdale; Gary F. Conner, Gilbertsville, both of Pa.

[73] Assignee: Emerson Electric Co., St. Louis, Mo.

[21] Appl. No.: 08/706,247

[22] Filed: Sep. 4, 1996

[51] Int. Cl.[6] .................................................. G01F 15/02
[52] U.S. Cl. ............................................... 73/861.01
[58] Field of Search ........................... 324/76.52, 76.55, 324/76.62, 76.77, 76.82; 73/861.01, 861.02, 861.03

[56] References Cited

U.S. PATENT DOCUMENTS

| | | | |
|---|---|---|---|
| 3,854,334 | 12/1974 | Herzl | 73/861.22 |
| 4,442,532 | 4/1984 | Takemura | 324/76.77 |
| 4,549,426 | 10/1985 | Erickson . | |
| 4,559,833 | 12/1985 | Sipin . | |
| 4,569,220 | 2/1986 | Hopfe, et al. . | |
| 4,636,719 | 1/1987 | Zuk et al. | 324/76.82 |
| 4,655,089 | 4/1987 | Kappelt et al. | 73/861.356 |
| 5,429,002 | 7/1995 | Colman | 324/76.82 |
| 5,438,254 | 8/1995 | Ho et al. | 324/76.82 |
| 5,525,899 | 6/1996 | Watanabe et al. | 324/76.82 |

*Primary Examiner*—Ronald L. Biegel
*Attorney, Agent, or Firm*—Polster, Lieder, Woodruff & Lucchesi

[57] ABSTRACT

A flowmeter (M) measures fluid flow in a system and produces a train (Si) of digital pulses representing the measured flowrate. The frequency of the pulses is intended to be proportional to the flowrate. A preamplifier (10) controls generation of output pulses (Fn, Fq) of an output digital pulse train (So). The preamplifier first decodes the digital pulse train using a phase discriminator (14). Output pulses from the discriminator are counted (at 24 and 46) to count the number of pulses and their frequency of occurrence. A frequency multiplier (40) is responsive to the pulses and their occurrence to generate each pulse of the output pulse train. Generation of these pulses involves use of a scaling factor (Vcf) by which meter performance factors, drift, and the fluid flow environment are taken into account. Use of the scaling factor enables the timing and frequency of the generation of pulses comprising the output pulse train to both be controlled so these pulses are produced at a rate which is linearly proportional to the measured fluid flowrate.

25 Claims, 5 Drawing Sheets

SMART FLOWMETER PRE-AMPLIFIER

BACKGROUND OF THE INVENTION

This invention relates to flowmeter instruments used in industrial applications, and more particularly, to an electronic flowmeter and preamplifier used with the flowmeter to deliver an electrical output signal having a value proportional to a measured flowrate. The flowmeter employs a scaling factor to take into account various operational factors of the flowmeter and the environment in which the fluid flow is measured, and both the timing and frequency of the generation of elements of the output signal are controlled.

Fluid flowmeters are used in a variety of applications. Some of the meters used; e.g., 'PD', turbine, and oval gear type meters, are mechanical meters. Others, e.g., magnetic, Coriolis, and vortex meters, are basically electronic flowmeters. These meters all provide an output signal which is a digital output. That is, the output comprises a train or stream of individual electrical pulses which together comprise the output signal. The pulses have signal characteristics which are a function of (proportional to) some measured unit of flow. Preferably, there is a linear relationship between the measured flowrate of a fluid and the digital signal output. This relationship is commonly referred to in the art as the K-factor and is usually ascertained during factory calibration of the meter. The value of the K-factor is stamped or otherwise recorded on the flowmeter. When the flowmeter output signal is provided to secondary instrumentation (electronic recording equipment, flow controllers, etc.) the gross flowrate of the fluid and a gross volume of flow can be determined using the K-factor.

In addition, other performance determinations can be made. One such determination is the net flowrate of the fluid. This value corrects for temperature and pressure effects on the fluid being metered; e.g., growth or shrinkage. A mass flowrate value can also be inferred if the density of the fluid is known or can be determined. Because of the various uses to which the flowrate information is used, it is extremely important that this information be accurate. This is particularly true in "custody-transfer" situations where a product is being conveyed between a buyer and a seller and the ultimate purchase price is based upon the measured quantity of fluid delivered through a pipeline or other means of conveyance. Such transfers are often governed by state or federal regulations and the flowmetering equipment used must further satisfy weight and measures standards imposed by these authorities.

A basic limitation of flowmeters is the minimum and maximum fluid flowrates over which they can accurately measure. The K-factor referred to above is generally specified for a particular flowrate/output pulse rate relationship. It is therefore accurate at that flowrate, but less so as the measured flowrates approach or exceed the minimum or maximum flowrates the meter can accommodate. In addition, the dynamics of the fluid flow effect the accuracy of the K-factor. That is, if the flow is turbulent rather than laminar, the accuracy of the K-factor is diminished.

Besides this calibration factor which is incorporated into the flowmeter readings, other factors must be considered as well. Another calibration factor is based upon the specific field conditions and wear to which the meter is or has been subjected, and the aging of the flowmeter components. This meter factor is developed during periodic field calibrations (proving) of the meter which take place after the meter is in use. This factor is used to "trim" the meter readings when an output pulse train from the meter is received by other equipment. A prover transports an accurate quantity of fluid through a flowmeter under certain test conditions (usually a steady flow rate), and an associated electronics measures the number of pulses emitted by the meter under test. Small volume (compact) provers go farther. These measure fractional portions of a meter pulse. This is done using a technique referred to as "dual-chronometry", and the technique maximizes the resolution of a calculated meter-factor.

Certain metering equipment now available utilizes multiple meter factors for use at different flowrates. For measured flowrates intermediate to those for which the factors are developed, the value of the factors is interpolated.

With mechanical flowmeters, other limitations must also be considered with respect to reading accuracy. For example, the K-factor relationship is good only for full or multiple revolutions of the mechanical metering element. There is a modulation effect produced by the gearing mechanism (such as occurs in oval gear flowmeters, for example). During uniform or steady-state flow conditions, this results in a repeatable pattern of pulses comprising an electrical output signal from the flowmeter. For low flow or unsteady flow situations, this condition causes non-linearity in the measurement which is, at times, unacceptable. And, current electronic systems are incapable of accommodating this variability in controlling the timing of individual pulses comprising a digital output of the flowmeter; this, even though the condition is a repetitive one.

SUMMARY OF THE INVENTION

Among the several objects of the present invention may be noted the provision of an electronic flowmeter and preamplifier usable in both electronic and mechanical flowmeters for controlling both the time at which an output pulse of digital output from the flowmeter is generated, and the spacing between or frequency with which successive output pulses are generated. This control of both timing and frequency allows the flowmeter to readily accommodate measurement factors relating to the flowmeter and its operation, and the flow conditions of fluid being metered.

A second object is the provision is to provide a flowmeter whose output is a scaled output with the scaling factor used in generation of pulses comprising the meter output so that the meter output is linearly proportional to the flowrate of a process. This scaling to provide linearity includes not only gross meter performance, but allows factoring for user defined or configured engineering units. That is, the output pulse rate can be scaled to provide an integral number of output pulses per defined unit of measurement.

A third object of the invention is the provision of the flowmeter and preamplifier to enable a user to elect net-volume and mass flow calculations. The scaling factor used by the flowmeter in controlling the timing and frequency of output pulse generation can be modified to include a volume scaling factor (VCF) or product density factor. The result is the use of a single, simple composite scaling factor which encompasses many, if not all, of the variety of factors which currently must be accommodated by secondary metering equipment used in conjunction with a flowmeter. This further simplifies the requirements of secondary measuring equipment to which the output from the flowmeter is supplied, and may even eliminate the need for some currently used metering equipment.

Yet another object of the invention is a flowmeter and preamplifier which readily responds to input pulses of up to 10–20 Khz and which provides an output pulse which has a delay of no more than one input pulse interval, even under unsteady flow conditions. As a result, the flowmeter or preamplifier is compatible with current, compact (small volume) prover technology employing dual chronometry to measure fractions of pulses albeit under more steady flow conditions.

Another object of the invention is a flowmeter preamplifier in which the arrival times of input pulses is observable so a "signature" timing can be determined either during factory calibration, or during field use under steady-state flow conditions. Subsequent major deviations from such signatures will thereafter indicate incipient problems in the flowmeter. These would include, for example, bent blades, bearing wobble, solids impact or the accumulation of solid material, etc. The flowmeter can then provide an indication of such condition so the flowmeter can be taken "off line" for repair, before actual breakdown.

A sixth object of the invention is the implementation of a method for controlling the generation of output pulses of a digital signal on the basis of the above referred to criteria.

Another object of the invention is a preamplifier which can be constructed using either application specific integrated circuit (ASIC) or microprocessor technology.

A further provision of the invention is provision of two separate output pulse streams, one such output being single channel output, and the other dual channel output in which quadrature pulses are encoded. These quadrature encoded pulses provide for additional security, or bidirectional flow indications. It is also a feature of the invention that inputs to, and outputs from, the preamplifier can be independently encoded.

Finally, it is a provision of the flowmeter and preamplifier to provide fast, accurate scaled measurements regardless of the type of fluid or fluid environment with which the flowmeter is used. With respect to the preamplifier, it is usable with all types of flowmeters to provide such measurements. Regardless of the type of meter in which the preamplifier is used, the preamplifier is capable of developing an appropriate scaling factor based upon the initial calibration and subsequent proving of the meter, and to provide a digital output which is compatible with a variety of secondary pieces of equipment to produce desired flowrate information.

In accordance with the invention, generally stated, a flowmeter measures fluid flow in a system. The flowmeter output represents the measured flowrate and is represented by a train of digital pulses, the frequency of the pulses being proportional to the flowrate. A measuring unit measures fluid flow, and a conversion unit converts this measurement to a digital signal comprising the train of pulses. A preamplifier module controls formation of an output pulse train from the flowmeter. The preamplifier first decodes the pulse train using a phase discriminator. Output pulses from the discriminator are counted to determine their number and frequency of occurrence. A frequency multiplier is responsive to the pulses and their occurrence to generate pulses of the output pulse train. Generation of these pulses involves a scaling factor which takes into account meter performance factors, including drift, and the fluid flow environment. Use of the scaling factor enables both the timing and frequency of the output pulse train pulses to be controlled; these pulses being produced at a rate which is linearly proportional to the measured fluid flowrate. The preamplifier is usable with a variety of flowmeters. A method of generating an output pulse train from a flowmeter is also disclosed. Other objects and features will be in part apparent and in part pointed out hereinafter.

BRIEF DESCRIPTION OF THE DRAWINGS

In the drawings.

Corresponding reference characters indicate corresponding parts throughout the drawings.

DESCRIPTION OF A PREFERRED EMBODIMENT

Figure 1:
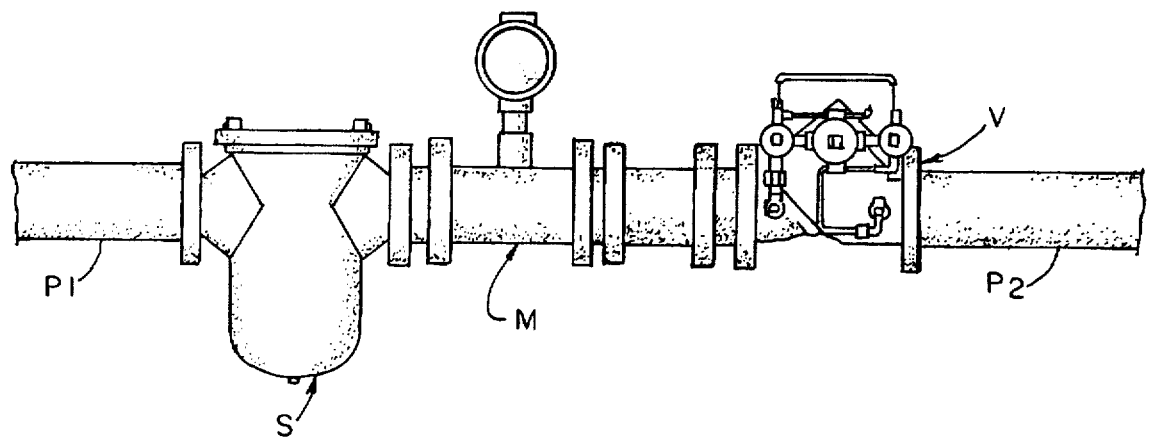
FIG. 1 is a simplified representation of a fluid flow environment in which a flowmeter and preamplifier of the present invention are employed.

Referring to FIG. 1, a simplified fluid flow system is shown to include pipe sections P1 and P2. Interposed in the fluid flow path between the respective pipes are linearly or serially connected devices including a strainer S, a flowmeter M, and a flow control valve V. The strainer acts as a filter for fluid flowing through the pipes, flowmeter M monitors the flowrate of the fluid, and the valve controls the flowrate. The functioning of the strainer and control valve are well-known in the art and form no part of this invention. Flowmeter M may be any of a variety of flowmeters, also as well-known in the art. For purposes of this invention, the only restriction on the type of flowmeter which flowmeter M must be, is that it provide an output signal which is a pulse based output signal. Accordingly, flowmeter M may be a turbine type flowmeter, a Coriolis effect type flowmeter, a magnetic flowmeter, etc., all without departing from the scope of the invention. The flowmeter represented in FIG. 1 is a turbine type flowmeter.

Figure 2:
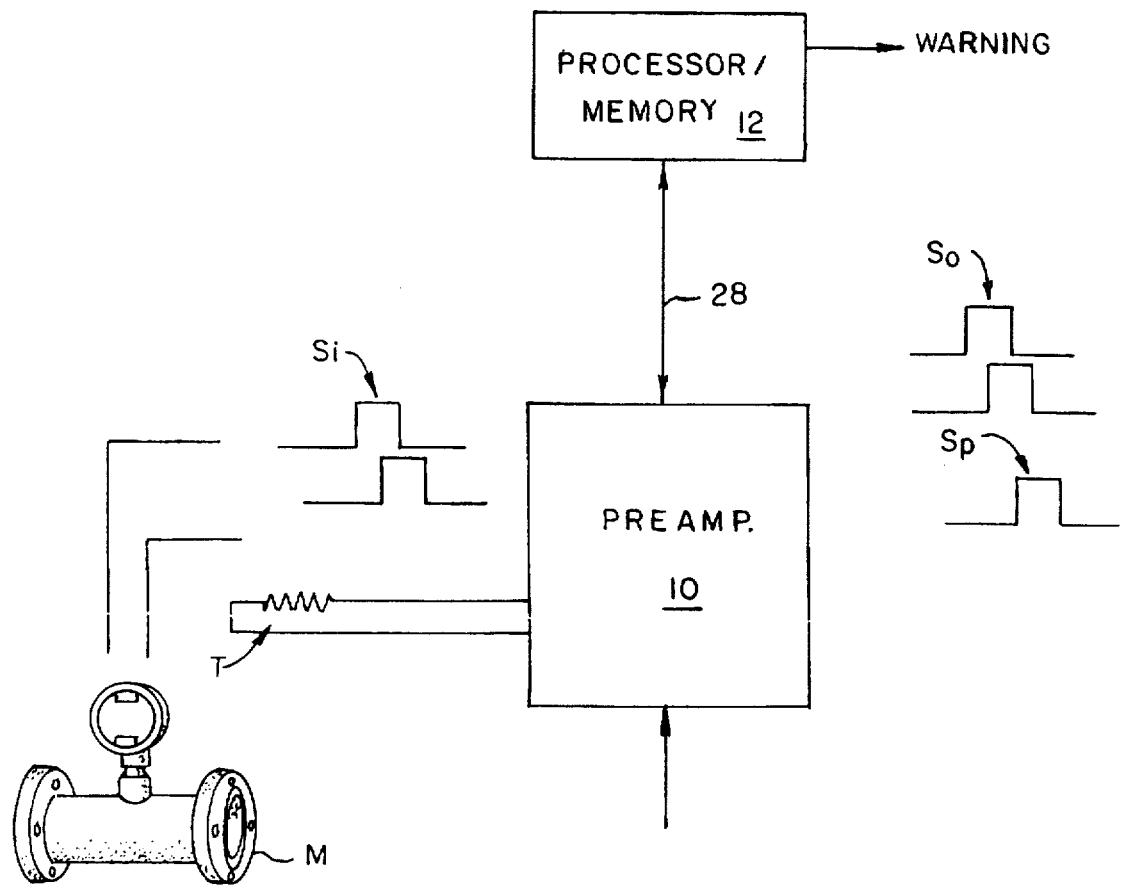
FIG. 2 is a representation of the preamplifier of the present invention used with a pulse based flowmeter and illustrating input signals to, and output signals from, the preamplifier.

In FIG. 2, flowmeter M is shown as producing a pair of output signals. One signal Si is a two-phase pulse signal which represents the measured flowrate of a fluid through pipe sections P1, P2. The other signal is an analog signal represented by a resistance temperature device (RTD) thermocouple T. This signal is used for compensating the measured flowrate as a function of the fluid temperature in these sections of the pipe. These signals are provided to a preamplifier 10 of the present invention. As described hereinafter, preamplifier 10, which may be implemented using an ASIC or microprocessor, supplies as an output, a first output signal So. Signal So is shown as a two-phase, encoded output signal representing a scaled measured flowrate in accordance with the teachings of the invention. The preamplifier further supplies an output signal Sp to a prover (not shown) used for field calibration of the flowmeter. Signal Sp is a single-phase, uncoded output signal. In addition, the preamplifier supplies an output to an associated processor/memory 12. This processor can calculate any appropriate compensations needed to be performed. These include correcting the pulse input/output for temperature and pressure effects on the fluid, or linearizing the meter across a wide range of flow rates.

Stored in the memory are signatures of output signal patterns for one or more fluids under a variety of steady-state flow conditions. If subsequent fluid flowrate measurements for the same fluid under the same or similar conditions produces a different pattern, this is indicative that something is starting to go wrong with the flowmeter. Memory 12 then generates a warning signal to alert the user of the incipient condition so the user can repair or replace the meter before the condition worsens.

Figure 3:
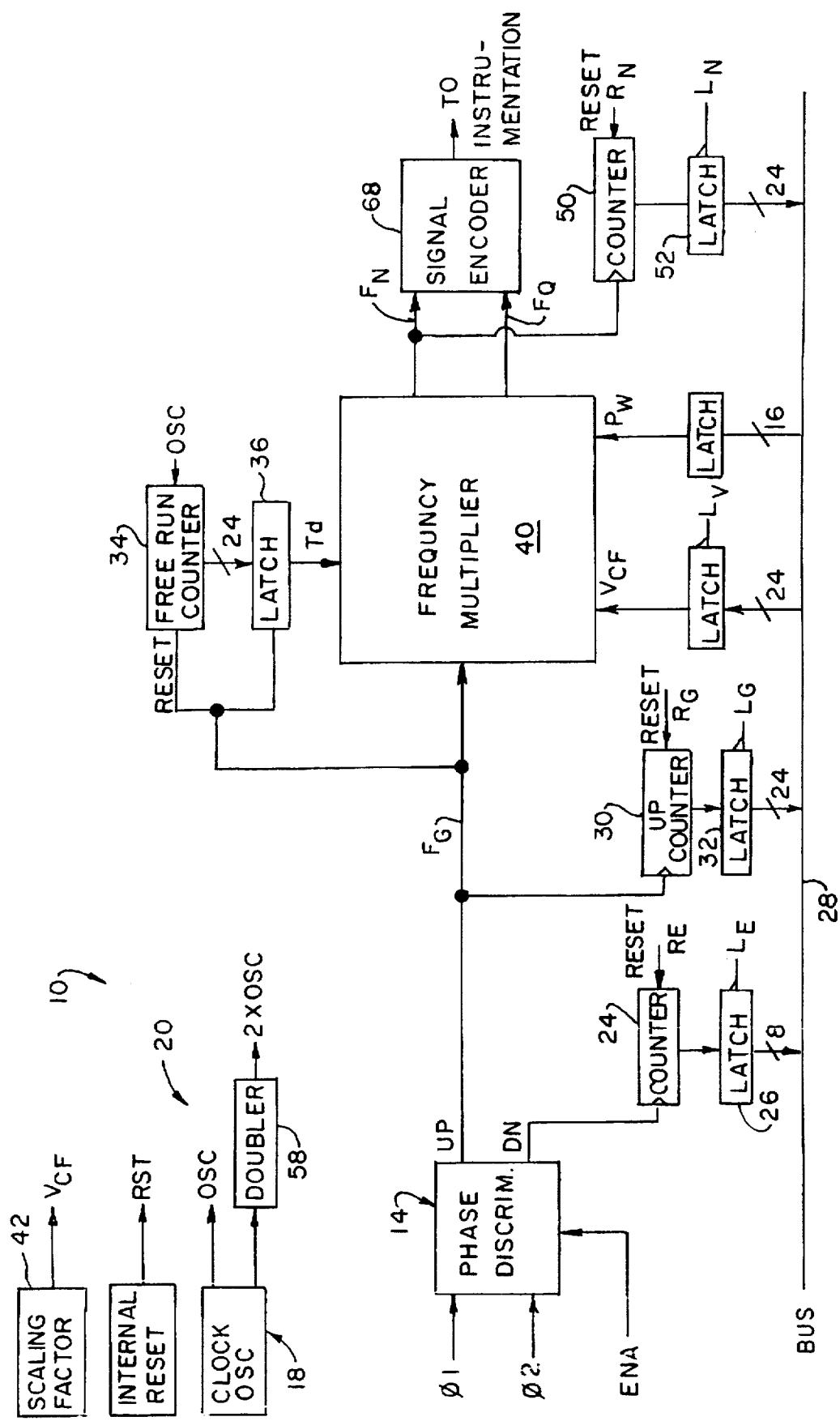
FIG. 3 is a block diagram of the preamplifier.
Figure 4:
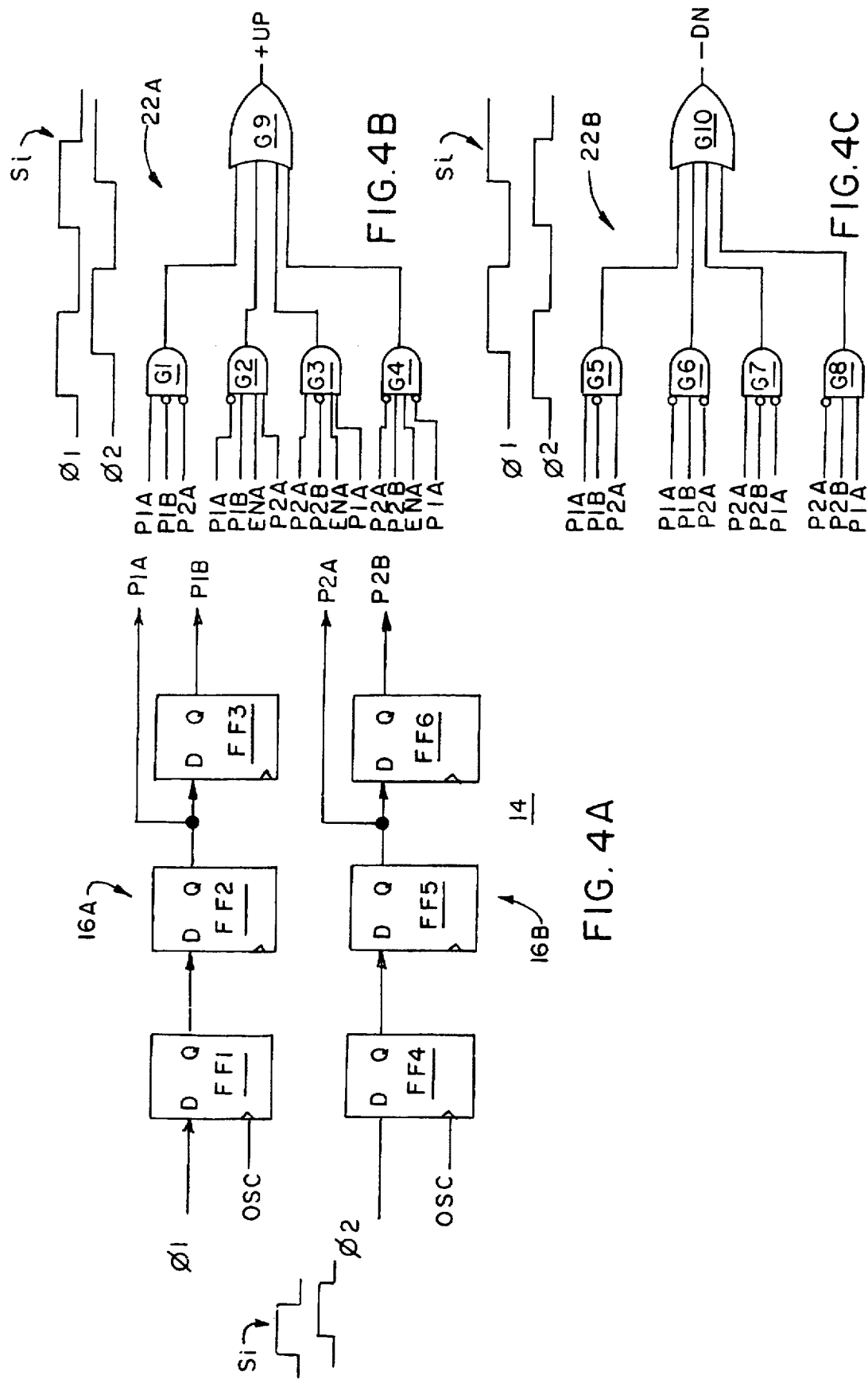
FIG. 4A illustrates a first portion of the phase discriminator of the preamplifier, and FIGS. 4B and 4C the circuitry of the preamplifier by which the phase relationship of input pulses is determined.

Referring to FIG. 3, it illustrates a hardware embodiment of the invention using, for example, an ASIC. Here, preamplifier 10 first includes a phase discriminator 14 to which the input signal Si is directed. The function of the phase discriminator is to decode the two-phase input provided to it to generate a series of up-count or down-count bits, as appropriate. For illustrative purposes, and as shown in FIG. 4A, the phase discriminator first includes two sets, 16A, 16B respectively, of D-type flip-flops. Those comprising set 16A are designated FF1–FF3, and those comprising set 16B are designated FF4–FF6. One phase $\phi 1$ of signal S1 is provided as an input to flip-flop FF1. In response to trigger inputs OSC supplied to the flip-flop from a clock 18 of a timing means 20, the phase $\phi 1$ portion of signal S1 is propagated through set 16A of flip-flops. Similarly, the phase $\phi 2$ portion of the signal is applied to the D input of flip-flop FF4 and is propagated through set 16B of flip-flops in response to clock signal inputs. Each set of flip-flops produces two output signals which are further processed to determine if the phase discriminator output represents an up count or a down count. From set 16A, a first signal P1A is taken from the Q output of flip-flop FF2, and a signal P1B from the Q output of flip-flop FF3. From set 16B, a signal P2A is taken from the Q output of flip-flop FF5, and a signal P2B from the Q output of flip-flop FF6.

The phase discriminator next includes two sets 22A, 22B of multi-input AND gates G1–G8. Set 22A includes gates G1–G4, and the output of these gates are applied to inputs of an OR gate G9. Set 22B includes gates G5–G8 whose respective outputs are supplied to an OR gate G10. The inputs to gate G1 or the respective signals P1A, P1B, and P2A, these latter signals being inverted at the gate G1 input. Gate G2 is provided these same signals with the P1A signal being inverted at the gate input. In addition, a signal ENA is also supplied as an input to this gate, as well as to gates G3 and G4. Because the input signal S1 can sometimes be a single phase input rather than the two-phase input being described, the ENA input is used to differentiate as to which type of input signal S1 is being processed. If a single phase input, the ENA input is at one level; if a two-phase input, a different level. Gates G3 and G4 are each supplied signals P1A, P2A, and P2B as inputs. For gate G3, the P2B input is inverted, for gate G4, the P1A and P2A inputs. The operation of the logic is such that if the phase relationship between $\phi 1$ and $\phi 2$ is as shown in FIG. 4B; that is, the $\phi 1$ signal is leading the $\phi 2$ signal, then the output from gate G9 represents an up count signal.

For gates 22B, gates G5 and G6 are each supplied P1A, P1B, and P2B inputs. The P1B input is inverted for gate G5, the other two inputs being inverted for gate G6. For gates G7 and G8, each receives signals P1A, P2A, and P2B as inputs. The P2A input is inverted for gate G8, the other two inputs being inverted foe gate G7. The operation of the logic is such that if the phase relationship between $\phi 1$ and $\phi 2$ is as shown in FIG. 4C in which the $\phi 1$ signal is lagging the $\phi 2$ signal, then the output from gate G10 represents a down count signal.

After the two-phase input signal is "unpacked" or decoded, the respective up and down count outputs from the phase discriminator are supplied to other portions of the preamplifier. The down count signals are supplied as inputs to an error counter 24. Counter 24 supplies its count value through a latch 26 to a data bus 28 which routes information or data to and from processor/memory 12. The output from the counter is supplied to the bus as an 8-bit error signal, for example. Latching of the count value is effected by a latch error signal Le supplied to latch 28. And, the count contents of counter 24 are reset by a reset signal Re.

The individual up count outputs of the phase discriminator (designated Fg hereinafter) are supplied, in parallel, to three using elements. First the signals Fg are supplied as inputs to an upcounter 30. Counter 30 is, for example, a 24 bit counter and simply counts the gross number of up counts since the last reset of the counter. The count value of counter 30 is supplied to bus 28 through a latch 32 to which is supplied a latch signal Lg. The contents of counter 30 are reset by a reset signal Rg.

Next, The signals Fg are supplied as an input to a free running counter 34. Counter 34 is used to determine the time interval between the occurrence of one output signal Fg, and the occurrence of the next signal Rg. Counter 34, which is also a 24-bit counter, is enabled by the occurrence of a pulse Fg to count the number of timing pulses supplied as an input to the counter. Upon the occurrence of the next pulse Fg, the count contents of the counter are latched by a latch 36 (to which the signal Fg is supplied in parallel with counter 34) and the counter is reset to zero. The count value of the counter is supplied as an input Td to a frequency multiplier 40.

Figure 5:
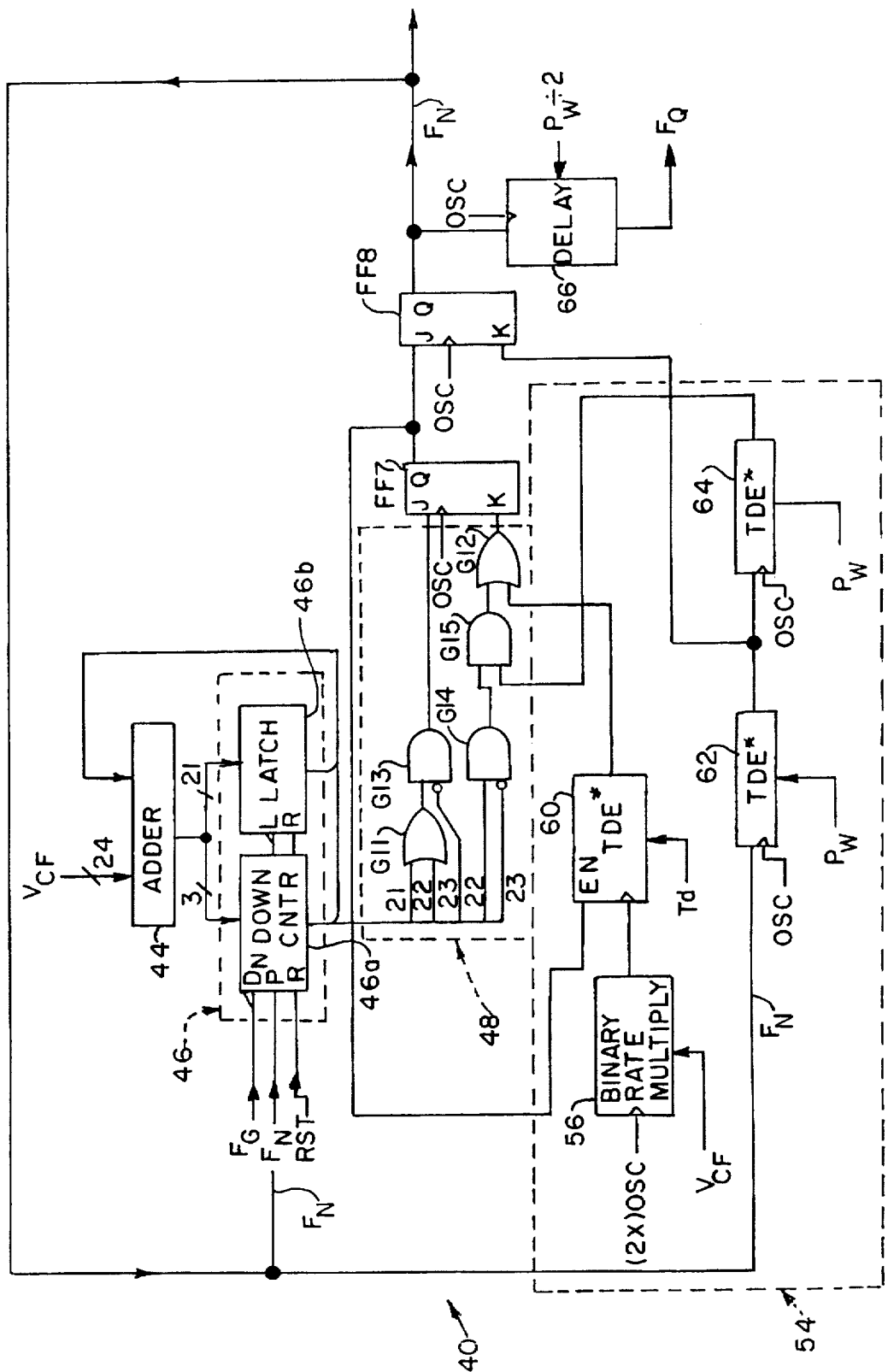
FIG. 5 is a block diagram of a frequency multiplier section of the preamplifier; and, FIGS. 6A and 6B are respective time lines illustrating the sequence of output pulses from the preamplifier in response to input pulses thereto when the scaling is less than 1.0 (FIG. 6A) and greater than 1.0 (FIG. 6B).

Referring to FIG. 5, in addition to the input Td to the frequency multiplier, the frequency multiplier is also supplied the up count signal Fg, and a scaling factor signal VCF. The scaling factor is used to take into account a number of operational factors relating to the meter and the fluid whose flowrate is being measured. For example, the scaling factor includes temperature and pressure (one or both) compensation methods for volumetric compression or expansion of the fluid. It further includes non-linearities in the meter for a wide range of flowrates. Importantly, and as further discussed hereinafter, the scaling factor has a range of values which extend between 0.0 and 2.0. Specifically, the value of VCF is a fixed point value with a binary point to the right of its most significant value. The value of VCF is always positive, and the bit format is as follows: the most significant bit (msb) is bit 23 which is the sign bit. Bits 22 and 21 encode the integer portion of VCF. And, bits 0–20 encode the fractional portion of the VCF value. The range of Vcf values can be between –4.000 and +3.999; but is typically between 0.000 and 1.999. The scaling factor value is determined by a module 42 of the preamplifier which may implemented as a microprocessor function, for example.

The scaling factor value VCF is supplied as an input to an adder 44. The output of the adder is supplied as an input to a 24-bit accumulator 46 which is comprised of a 21-bit latch 46a, and a 3-bit counter 46b. The latch contains the lower (fractional) bits of the accumulator value (bits 0–20), and the counter the upper three bits (bits 21–23, with bit 23 representing whether the count value is positive or negative). The contents of the accumulator are incremented each time an up count input Fg is supplied as an input to counter 46a. If the value of VCF is less than 1.0, for example 0.2, then each time an input signal Fg occurs at counter 46a, the counter contents are increased 0.2. Thus, the contents of counter 46a would be 0.2, 0.4, 0.6, etc. as successive pulses Fg are supplied to the counter.

The output of counter 46 is supplied to a logic means 48 comprising OR gates G11 and G12, and AND gates G13–G15. Bits 21 and 22 (the two most significant value bits of the accumulator) are supplied as inputs to OR gate 11 the output of which is one input to gate G13. The sign bit 23 of the accumulator is supplied as the other input to gate G13 input and inverted at the input to the gate. Bits 22 and 23 are further supplied as inputs to gate G14 with bit 23 again being inverted at the gate input. The output of gate G13 is applied to the J input of a JK flip-flop FF7. The output of gate G14 is supplied as one input of gate G15, the output of which is one input to OR gate G12. The gate G12 output is supplied to the K input of the flip-flop.

In operation, when the value of accumulator 46 exceeds 1.0, bits 21 and/or 22 are a high and bit 23 is low. For this condition, the output of logic means 48 causes flip-flop FF7 to be set. The Q output of the flip-flop is supplied to the J input of a JK flip-flop FF8 which is now set upon occurrence of the next clock pulse supplied to the flip-flops. Setting of flip-flop FF8 creates a pulse Fn which comprises one element of the digital output signal supplied by the preamplifier or flowmeter to secondary instrumentation.

As with pulse Fg, pulse Fn is supplied to a number of places. As noted, it represents the preamplifier output. It is also supplied to a counter 50 (see FIG. 3) and through a 24-bit latch 52 to data bus 28. Counter 50 is reset by a signal Rn, and latch 52 is latched by a signal Ln. As shown in FIG. 5, the signal is also fed back to accumulator 46, and specifically, to counter 46a of the accumulator. In response to the Fn signal, the content value of the accumulator is decremented by a value of 1.0. The effect of this is that the contents of the accumulator are constantly being varied in response to the scaled input resulting from the occurrence of an input caused by an Fg signal, and a decrementation resulting from the production of a pulse Fn. Over time, the ratio of the number of occurrences of Fn to Fg can be seen to be equal to VCF.

Finally, the pulse is also supplied to a module 54 which controls the timing of pulse generation by controlling the reset of flip-flop FF7. That is, once the flip-flop is set by the input from logic means 48 to generate an output pulse Fn, another pulse Fn cannot be produced until the flip-flop is reset. By controlling the period of time during which the creation of new pulses is prevented, the net number of output pulses from the preamplifier are evenly spaced out. The result is a smooth output stream of pulses compatible with compact prover systems.

Module 54 first includes a binary rate multiplier 56 having as one input a clock signal supplied by a frequency doubler 58 (see FIG. 3). This clock signal is twice the rate of the clock signal otherwise supplied by clock oscillator 18. The other input to the multiplier is the scaled input VCF. As previously discussed, the value VCF preferably range between 0.000 and 1.999. Consequently, depending upon this value, the multiplier output is a scaled clock signal, to a time delay energizer (TDE) counter 60, to either stretch out, or shrink, the period between pulse Fn production. Counter 60 has a preset count value supplied by the output Td from counter 34 and latch 36 (see FIG. 3). The input Td represents the period for the previous two pulses. The counter has a third or "enable" input which normally inhibits counter 60 from responding to inputs from multiplier 56. The enable input is changed by a "pulse" input from flip-flop FF7 which occurs when the flip-flop is set. Now, counter 60 counts down to zero from its preset value. When the zero count is reached, the output of the counter changes logic state. The counter output is applied to one input of OR gate G12 causing the output of the OR gate to go "high", and thereby reset flip-flop FF7. Resetting the flip-flop also terminates the "pulse" input to counter 60, again inhibiting the counter.

The signal Fn is also supplied to a counter 62 of module 54 and enables the counter to count clock pulses provided by oscillator 18 (see FIG. 3). When enabled by pulse Fn, the counter counts down from a preset value Pw (representing pulse width) which is supplied to the counter over data bus 28. The pulse width determined by value Pw is that required by secondary processing equipment for processing the output pulses from the preamplifier. When the count value reaches zero, the counter output changes from one logic state to another. The output of counter 60 is supplied directly to the K input of flip-flop FF8, changing the output state of the flip-flop back to its initial state, and terminating pulse Fn.

The output of counter 62 is additionally supplied as an enabling input to a counter 64. Counter 64 is also supplied the value Pw and also counts down from the preset value represented by this input to zero. The output of counter 64 is a delayed from that of counter 62. This counter 64 output is supplied as a second input to AND gate G15. By so doing, flip-flop FF7 will now be reset earlier than it would be by output of counter 60 through gate G12. This allows pulses Fn to be generated more rapidly than as previously described. This is done, for example, during a rapidly accelerating measured fluid flowrate, and allows flip-flop FF7 to be reset, then set, more rapidly than ordinarily occurs by counter 60.

As previously described, the signal supplied to the preamplifier may be an encoded signal which is decoded using the phase discriminator. Where the input signal is encoded, it is usually intended for the output signal to be encoded as well; although, the input or output may be independently encoded. To accomplish this, output signal Fn is supplied to a counter 66 which is a delay counter. Signal Fn enables the counter to count clock pulses from oscillator 18. The delay counter counts down from a value equal to the pulse width Pw/2. As a result, a quadrature output pulse Fq is generated, when the delay counter value reaches zero. Pulse Fq is supplied in parallel with pulse Fn but delayed such that the resultant encoded output signal from the preamble has a pattern similar to that shown for the input signal Si in FIG. 4A, but 90° out of phase. If the output from the preamplifier is to be encoded, the Fn and Fq output signals are supplied to a signal encoder (not shown). The encoder output is then supplied to the instrumentation with which the preamplifier is used.

Figure 6A:
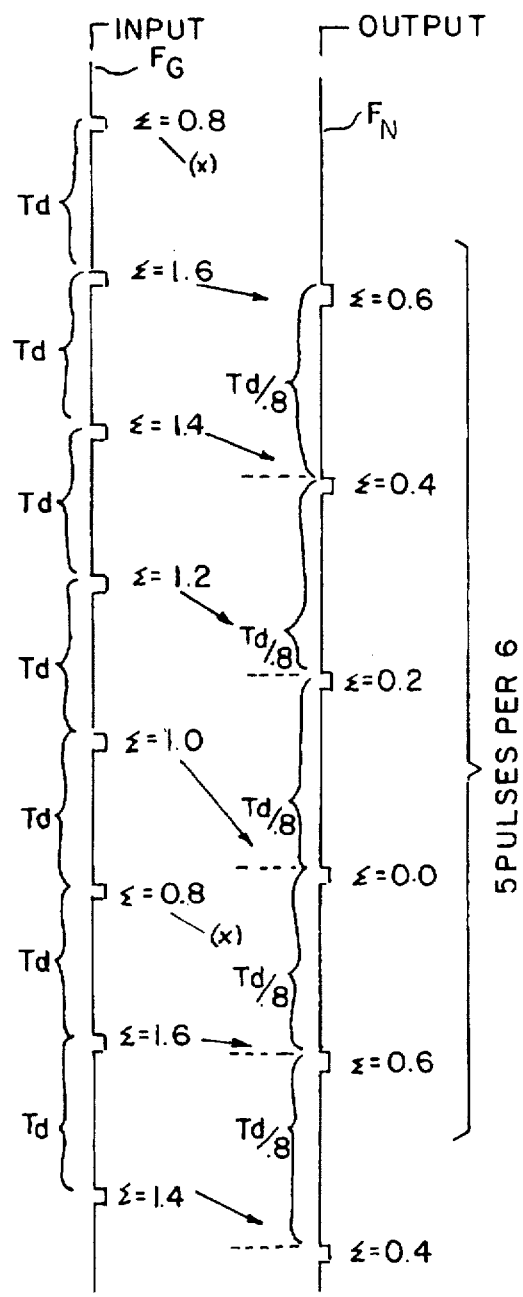
Figure 6B:
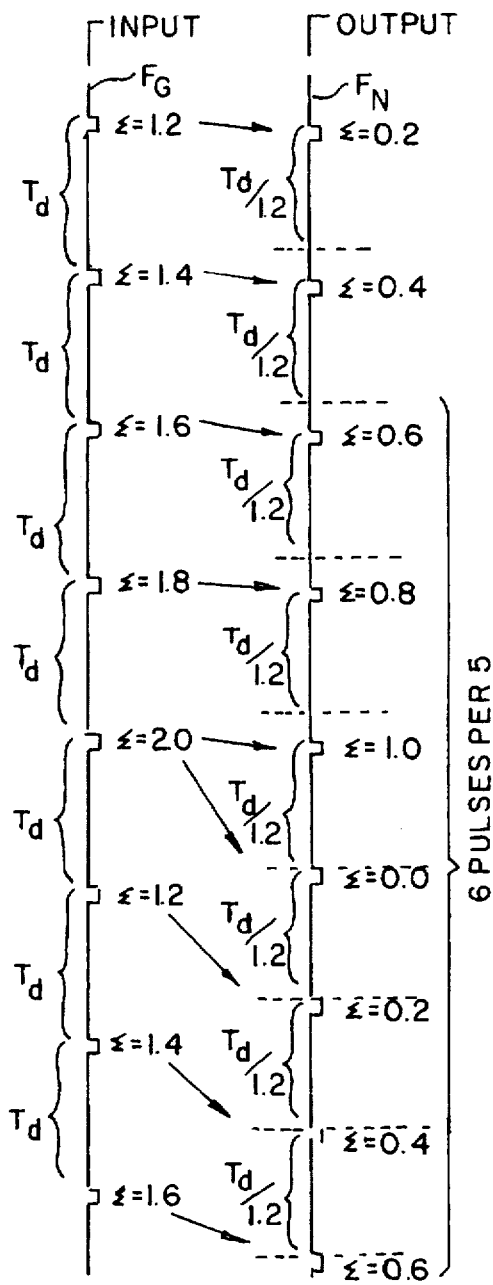

Finally, to further help understand operation of the invention, FIGS. 6A and 6B illustrate how the preamplifier functions when the scaling factor VCF is less than 1.0 (FIG. 6A), and greater than 1.0 (FIG. 6B). Reading from top to bottom in FIG. 6A, when a first pulse Fg is supplied to counter 46a of accumulator 46, the contents of the accumulator are incremented by the value of the scaling factor VCF. In the example of FIG. 6A, this value is 0.8. A time interval equal to Td later, the next pulse Fg is supplied to counter 46a, increasing the contents of the accumulator to a value of 1.6. Because the contents of the accumulator now exceed 1.0, a signal Fn is generated, as previously described. The pulse Fn is supplied to the accumulator to decrement the contents of counter 46a by a value of 1.0, reducing the value of the accumulator contents to 0.6. When the next pulse Fg arrives, the accumulator content value increases to 1.4. Because this value again exceeds 1.0, another pulse Fn is produced and again supplied to counter 46a to decrease the value of the accumulator to 0.4. It will be noted that in accordance with the previous description, the spacing between successive pulses Fn is Td/VCF, or Td/0.8. As shown, the contents of accumulator are continuously incremented by 0.8 with each pulse Fg, but a pulse Fn is produced only when the counter contents exceed 1.0. For the given scaling factor value, this means that a pulse Fn is not necessarily generated each time a pulse Fg increments the contents of the accumulator. Rather, and as shown in FIG. 6A, two successive pulses Fg may arrive to increment the accumulator contents before a pulse Fn is produced. This occurs, for example, when the accumulator content value is 0.0.

In FIG. 6B, the scaling factor is 1.2. When the first pulse Fg is supplied to accumulator 46, the contents of counter 46a equal 1.2 which exceeds the value 1.0. A pulse Fn is now produced and its application to the counter decrements its content value to 0.2. With the next pulse Fg, the content value is raised to 1.4. Again, a pulse Fn is produced because the resulting accumulator value is raised over 1.0. Note the spacing between these successive pulses is Td/1.2. That is, in some instances two successive pulses Fn will be produced between the time successive pulses Fg arrive to increment the accumulator contents. For example, when the contents of the accumulator equal 0.8, the next pulse Fg causes the value to be increased to 2.0. A pulse Fn is produced which causes the content value of the accumulator to be decreased to 1.0. Because this value is still equal to 1.0, another pulse Fn is generated which causes the accumulator contents to again be decreased, this time to 0.0. And, as shown in the Fig., the two successive pulses Fn are produced before the next pulse Fg increments the accumulator contents from 0.0 to 1.2.

It will be noted that there is a delay of no more than input pulse interval in providing an output pulse to using equipment. And, this level of performance is provided even when the input pulse rate is on the order of 10–20 Khz.

What has been described is an electronic flowmeter and flowmeter preamplifier. The preamplifier is usable with either electronic and mechanical flowmeters which provide a pulse based digital output signal. The preamplifier controls both the time at which an output pulse of digital output from the flowmeter is generated, and the frequency of these pulses. Control of timing and frequency allows accommodation of various factors to be taken into account for measurement accuracy. The flowmeter output is a scaled output with which is linearly proportional to the flowrate of a process. Scaling also allows factoring for user defined engineering units with the output pulse rate scaled to provide an integral number of output pulses per defined unit of measurement. Net-volume and mass-volume flow calculations can also be made and the scaling factor can be modified to include a volume scaling factor or product density factor. Use of a single, composite scaling factor produces an output signal which simplifies the requirements of secondary measuring equipment to which the output from the flowmeter is supplied. The flowmeter and preamplifier are compatible with current prover technology. A memory used in conjunction with the preamplifier stores a timing "signature" for the measurement of particular fluids under certain flow conditions. Subsequent deviations from such a signature is indicative of incipient problems with the flowmeter, and result in an indication thereof being provided so the flowmeter can be repaired before a major difficulty arises. The invention further includes a method for controlling the generation of output pulses of a digital signal on the basis of the above the input to the preamplifier and the scaling factor employed. The preamplifier can either be structured using ASIC or microprocessor technology. Signal encoding may be provided for security purposes. Overall, the preamplifier provides a fast, accurate, scaled measurement when used with a wide range of fluids and fluid flow environments in which a flowmeter is used. Regardless of the type of meter in which the preamplifier is used, the preamplifier is capable of developing an appropriate scaling factor based upon the initial calibration and subsequent proving of the meter, and provides a digital output compatible with a range of other test equipment to provide flowrate information.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A flowmeter for measuring fluid flow in a system wherein the flowmeter provides as an output representing the measured flowrate a train of digital pulses in which the frequency of the pulses is proportional to the flowrate comprising:

means measuring fluid flow;

means converting the measured flowrate to a digital signal comprising a train of encoded digital pulses; and, control means controlling the digital pulse train as a function of meter performance factors including the range of flowrates the meter accommodates, meter aging and wear, meter drift, and the fluid flow environment, said control means combining the effects of the aforesaid factors into a scaling factor by which the timing of the generation of pulses comprising the pulse train, and the frequency of pulse generation are both controlled, individual pulses comprising the pulse train being produced at a rate which is linearly proportional to the fluid flowrate thereby to simplify subsequent processing of the digital signal, said control means including decoding means decoding the pulses and providing an output pulse representing a pulse of the digital pulse train, and frequency multiplier means responsive to the output of the decoding means for producing pulses forming the output digital pulse train from the flowmeter; and first and second counter means, said first counter means counting each output pulse from said decoding means, and said second counter means being triggered by each output pulse from the decoding means to count clock pulses provided by a timing means, said second counter means counting until the occurrence of the next output pulse from the decoding means, the count of said second counter means representing the time interval between output pulses from the decoding means, and the second counter means supplying a frequency interval signal representing this time interval.

2. The flowmeter of claim 1 wherein said frequency multiplier means includes adder means having as one input output pulses from the decoding means, and as a second input said scaling factor.

3. The flowmeter of claim 2 wherein adder means includes an accumulator the contents of which are incremented by the value of the scaling factor each time an output pulse from said decoding means is supplied to said adder means.

4. The flowmeter of claim 3 wherein the value of said scaling factor is within a range of values including values greater than, less than, or equal to unity.

5. The flowmeter of claim 4 wherein said frequency multiplier further includes pulse generation means responsive the instantaneous value of the contents of the accumulator to generate an output pulse of the digital pulse stream, each said output pulse not being generated unless the value of said accumulator contents exceeds a predetermined value.

6. The flowmeter of claim 5 wherein said frequency multiplier further includes feedback means for decrementing the content value of said accumulator by a predetermined amount each time a pulse of said digital pulse stream is generated.

7. The flowmeter of claim 6 wherein the feedback means includes means for decrementing the accumulator contents by a value equal to a positive, whole integer.

8. The flowmeter of claim 7 wherein said frequency multiplier means includes delay means for delaying the generation of pulse of said digital pulse train.

9. The flowmeter of claim 8 wherein said delay means includes means responsive to the value of said scaling factor and an output from said second counter to control the timing of said pulse generation means to space the time over which pulses of said digital pulse train are produced thereby to control the timing of pulse generation.

10. A preamplifier for use in an electronic flowmeter for measuring the fluid flowrate in a system and converting the measured flowrate to a digital signal output representative thereof, the preamplifier including:

counter means for counting pulses comprising a digital signal supplied to said preamplifier and representing a measured fluid flowrate;

means for multiplying an instantaneous value of said counter means by a scaling factor to produce a scaled value;

pulse generation means responsive to the scaled value exceeding a first predetermined value to generate an output pulse of the digital signal output;

adjusting means responsive to said output pulse to decrement the scaled value by a second predetermined value, the resulting decremented value being a value less than said first predetermined value; and, spacing means responsive to the digital signal pulses and said scaling factor to control the spacing between pulses comprising the digital signal output whereby both the frequency and timing of the digital signal output pulses are controlled for the digital signal output to be proportional to the measured flowrate.

11. The preamplifier of claim 10 wherein the pulses comprising the digital signal are encoded pulses and the preamplifier further includes decoding means for decoding the pulses and providing an output pulse representing a pulse of the digital signal.

12. The preamplifier of claim 11 wherein said decoding means includes a phase discrimination means to which first and second digital pulses are supplied, the phase of one pulse being shifted with respect to the phase of the other pulse with the relative phases between the two pulses determining whether or not the input to the phase discrimination means represents a pulse of the digital pulse train, the phase discrimination means determining the phase relationship between the two input pulses and providing as a first output a pulse representing a pulse of the pulse train, and a second output representing an error signal.

13. The preamplifier of claim 10 wherein said counter means includes first and second counter means, said first counter means counting each digital pulse and said second counter means being triggered by each digital pulse to count clock pulses provided by a timing means, said second counter means counting until the occurrence of the next digital pulse with the resultant count of said second counter means representing the time interval between digital pulses, and the second counter means supplying a frequency interval signal representing this time interval.

14. The preamplifier of claim 13 wherein said multiplier means includes an accumulator the contents of which are incremented by the value of the scaling factor each time an output pulse from said counter means is supplied to said accumulator, the value of said scaling factor being within a range of values including values greater than, less than, or equal to unity.

15. The preamplifier of claim 14 wherein the value of said scaling factor has a range of between 0.0 and 2.0.

16. The preamplifier of claim 15 wherein the pulse generation means is responsive to the instantaneous scaled value of the accumulator contents to generate said output pulse of the digital signal output, each said output pulse only being generated when the value of said accumulator contents exceeds a predetermined value.

17. The preamplifier of claim 16 wherein the pulse generation means generates said output pulse of the digital signal output only when the value of said accumulator contents exceeds a value of 1.0.

18. The preamplifier of claim 16 wherein said adjusting means includes a feedback path from an output of said means responsive to the scaled accumulator value to said accumulator for decrementing the content value of said accumulator by said second predetermined amount each time an output pulse is generated.

19. The preamplifier of claim 18 wherein said adjustment means decrements the accumulator contents by a value equal to a positive, whole integer.

20. The preamplifier of claim 19 wherein said adjustment means decrements the accumulator contents by a value of 1.0.

21. The preamplifier of claim 18 wherein said spacing means includes time delay means responsive to an output of said second counter, an intermediate output signal from said generation means, and an input derived from said scaling factor and clock signals from said timing means to control the timing of generation of said output pulse of said digital output signal.

22. In a flowmeter for measuring the flowrate of a fluid in a system, a method of generating a digital output signal representing the flowrate comprising:

generating a digital pulse train including a plurality of digital pulses;

summing the pulses to obtain an instantaneous sum of pulses at any one time;

multiplying the instantaneous sum by a scaling factor derived from the operational characteristics of a flowmeter used to measure fluid flow and the fluid environment in which the flowrate is measured to produce a scaled sum value;

subtracting from said scaled sum value a number representing each pulse of an output signal produced;

summing the scaled value minus the number of output pulses produced to produce a resultant value;

generating an output pulse if the resultant value exceeds a predetermined value but not if the resultant value is less than the predetermined value; and, decrementing the resultant value by a number representing the output pulse produced whereby the timing and frequency of output pulse production is controlled and the pulses produced are represent a value proportional to the measured flow rate.

23. A method of producing a digital signal representing a measured fluid flowrate comprising:

measuring the flowrate of a fluid in a system;

generating a train of pulses in response to the measurement;

determining the frequency at which pulses are generated during an interval defined by the occurrence of successive pulses; and, generating pulses comprising said digital signal by multiplying the frequency of occurrence of pulses of said train of pulses by a scaling factor representative of the performance characteristics of a device used to perform the flowrate measurement and the fluid flow environment wherein determining the frequency at which pulses in said train of pulses occur includes counting the pulses in a first counting means; and counting clock pulses generated by a timing means in a second counting means, said second counting means being actuated to count timing pulses by the occurrence of one pulse of said train, and inhibited from counting timing pulses by the occurrence of the successive pulse in said train, whereby the interval represented by the counted timing pulses represents the interval between the successive pulses of said pulse train.

24. The method of claim 23 wherein multiplying the frequency of pulse occurrence includes:

incrementing the contents of an accumulator means by a scaled value with the occurrence of each pulse of said pulse train;

generating an output pulse of said digital signal when contents of said accumulation means exceeds a predetermined value; and, feeding back the output pulse generated to said accumulation means to decrement the value of the accumulation means by a second predetermined value for the resulting value of said contents to be less than said first predetermined value.

25. The method of claim 24 wherein generating pulses of the output signal further includes spacing the production of the pulses of said output signal as a function of the interval between successive pulses as represented by said second counting means contents, and said scaling factor.

* * * * *